United States Patent
Schachter et al.

(10) Patent No.: US 12,381,819 B2
(45) Date of Patent: Aug. 5, 2025

(54) MAC LEARNING FOR CROSS-SITE LAYER-2 CONNECTIVITY

(71) Applicant: VMware LLC, Palo Alto, CA (US)

(72) Inventors: Jesse Schachter, Little Elm, TX (US); Chung-Shang Shao, Hayward, CA (US); Siddharth Sudhir Ekbote, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 8 days.

(21) Appl. No.: 18/195,574

(22) Filed: May 10, 2023

(65) Prior Publication Data
US 2024/0380694 A1    Nov. 14, 2024

(51) Int. Cl.
*H04L 45/74* (2022.01)
*H04L 45/76* (2022.01)
*H04L 61/103* (2022.01)

(52) U.S. Cl.
CPC .............. *H04L 45/74* (2013.01); *H04L 45/76* (2022.05); *H04L 61/103* (2013.01)

(58) Field of Classification Search
CPC ........ H04L 45/74; H04L 45/76; H04L 61/103
See application file for complete search history.

(56) References Cited

U.S. PATENT DOCUMENTS

| | | | | |
|---|---|---|---|---|
| 2005/0063307 | A1* | 3/2005 | Samuels | H04L 41/12 370/235 |
| 2013/0238785 | A1* | 9/2013 | Hawk | G06F 9/5072 709/224 |
| 2015/0089032 | A1* | 3/2015 | Agarwal | H04L 41/0816 709/221 |
| 2018/0176124 | A1* | 6/2018 | Kancherla | H04L 61/2521 |
| 2021/0067466 | A1* | 3/2021 | Parab | H04L 49/3009 |
| 2022/0385620 | A1* | 12/2022 | Sinha | H04L 61/103 |

* cited by examiner

*Primary Examiner* — Chris Parry
*Assistant Examiner* — Steven C Nguyen
(74) *Attorney, Agent, or Firm* — Quarles & Brady LLP (57) ABSTRACT

Mac learning for cross-site layer-2 connectivity. Some embodiments provide a method for enabling data traffic to be sent between across which a logical network spans. A logical network segment (i.e., a layer-2 network segment such as a logical switch) spans at least two sites via tunnels between network elements deployed in the sites that operate as bridges (or 2-port switches) to pass data traffic between the sites without leaving the logical network segment. Because these network elements operate similarly to bridges, they are not assigned network (layer 3) addresses (e.g., IP addresses). In order to send address resolution protocol (ARP) requests to a router in one site, the network element in another site uses a network address of one of the data compute nodes (DCNs) operating in its site that is connected to the logical network segment spanning the two sites.

21 Claims, 7 Drawing Sheets

MAC LEARNING FOR CROSS-SITE LAYER-2 CONNECTIVITY

BACKGROUND

Hybrid cloud solutions enable the extension of logical networks from on-premises datacenters (sites) into virtual datacenters implemented in the cloud (e.g., in a public cloud such as Amazon AWS, Microsoft Azure, etc.). In some cases, the extension of a logical network is made possible by the deployment of extension network elements in both the on-premises datacenter and the virtual datacenter, with a tunnel between the two network elements. However, such an extension of a logical network can bring up various networking problems that need to be solved.

BRIEF SUMMARY

Some embodiments provide a method for enabling data traffic to be sent between sites across which a logical network spans. A logical network segment (i.e., a layer-2 network segment such as a logical switch) spans at least two sites via tunnels between network elements deployed in the sites that operate as bridges (or 2-port switches) to pass data traffic between the sites without leaving the logical network segment. Because these network elements operate similarly to bridges, they are not assigned network (layer 3) addresses (e.g., IP addresses). In order to send address resolution protocol (ARP) requests to a router in one site, the network element in another site uses a network address of one of the data compute nodes (DCNs) operating in its site that is connected to the logical network segment spanning the two sites. The network element selects such an eligible DCN and uses the network address of that selected DCN to send an ARP request to the router located at the other site (because a network address is required in order to use ARP). Upon receiving an ARP response from the router with that router's data link address, the network element can use the router's data link address to forward traffic directed to DCNs at the router's site that are connected to a different logical network segment that is (i) confined to that site and (ii) accessible via the router.

In some embodiments, the logical network spans a hybrid cloud that includes a physical on-premises datacenter site and a virtual datacenter site that operates in a public cloud (for the same enterprise that owns the physical on-premises datacenter). In some embodiments, such virtual datacenters include both network endpoints (e.g., application data compute nodes) and management components (e.g., local network manager and network controller components) that configure the logical network within the virtual datacenter. Though operating within a public cloud, in some embodiments the virtual datacenters are assigned to dedicated host computers in the public cloud (i.e., host computers that are not shared with other tenants of the cloud). Virtual datacenters are described in greater detail in U.S. patent application Ser. No. 17/852,917, which is incorporated herein by reference. In other embodiments, the virtual datacenter within the public cloud may be a native virtual private cloud (VPC) of the public cloud or other virtual site implemented in the public cloud.

In some embodiments, the logical network includes at least (i) the first logical network segment that spans at least first and second sites (extended between the sites via the network elements deployed at each of the sites) and (ii) the second logical network segment that is confined to the second site (e.g., the on-premises datacenter). In this case, a first router (e.g., a logical router or physical router) is deployed at the second site to connect the two logical network segments. If a third logical network segment is also added to the logical network and confined to the first site (e.g., the virtual datacenter), then a second router (e.g., a distributed logical router) is deployed at the first site to connect the first logical network segment to the third logical network segment. Because the first and second routers both connect to the first logical network segment, the interfaces of these routers that connect to the first logical network segment are assigned the same network address. This network address is the default gateway for the DCNs (e.g., virtual machines, containers, etc.) that connect to the first logical network segment.

By default, the networking constructs at the first site (e.g., logical networking implemented in virtualization software of the host computers on which the DCNs operate) are configured to direct traffic sent from the DCNs to the default gateway to the second router (at the first site). This network is described further in U.S. Pat. No. 10,419,340, which is incorporated herein by reference. In some embodiments, this second router is also implemented as a distributed router in the virtualization software of the host computers. However, data traffic sent from source DCNs at the first site connected to the first (multi-site) logical network segment to destination DCNs connected to the second logical network segment confined to the second site are intercepted by the networking constructs and sent to the network-extending network element to be tunneled to the corresponding network element at the second site, at which point that corresponding network element can send the traffic to the first router.

The data traffic sent to the shared network address will have the local router data link (e.g., MAC) address as its destination address when sent from a source DCN, as these DCNs simply send this traffic to their default gateway (and are unaware of the underlying networking). In some embodiments, the networking constructs at the first site are configured to intercept data traffic sent to network addresses of DCNs at the second site and, rather than sending this traffic to the default gateway (i.e., the second router), instead direct the traffic to the network element at the first site in order for that network element to tunnel the traffic to the corresponding network element at the second site (which then directs the traffic to the first router).

In order for this system to operate correctly, the network element at the first site needs to learn the data link address of the first router (at the second site). The router data link address may change from time to time (e.g., due to failover, deletion of an old router and creation of a new router, etc.), and thus the router's data link address cannot be statically configured at the network element. Instead, the network element learns the data link address through the use of ARP.

However, the network element does not have its own network address, while a network address is required to send an ARP request. Thus, the network element at the first site identifies an eligible DCN located at the first site and uses the network address of that DCN to send an ARP request to the first router at the second site via the tunnel between the sites. The ARP response will be broadcast on the logical network segment at the second site and thus received by the router, which responds with its data link address (in an ARP response addressed to the network address of the identified DCN). This ARP response will be sent across the tunnel between the sites at which point the network element at the first site recognizes the destination network address and learns the router data link address (rather than directing the ARP response to the identified DCN).

The network element at the first site uses this "borrowed" network address for ARP requests to the first router at the second site so long as the DCN remains at the first site. The logical network segment spanning the sites allows easy migration (without any DCN downtime) across the sites. If the DCN whose network address is used by the network element for ARP purposes is migrated from the first site to the second site, then the network element is notified (e.g., by a network manager or controller) that the DCN is no longer eligible for this purpose (because that DCN will be visible to the router at the first site and could send its own ARP requests to that router). In this case, the network element selects a different eligible DCN and uses the network address of that DCN for any subsequent ARP requests.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for enabling data traffic to be sent between sites across which a logical network spans. A logical network segment (i.e., a layer-2 network segment such as a logical switch) spans at least two sites via tunnels between network elements deployed in the sites that operate as bridges (or 2-port switches) to pass data traffic between the sites without leaving the logical network segment. Because these network elements operate similarly to bridges, they are not assigned network addresses (i.e., layer 3 addresses, such as IP addresses). In order to send address resolution protocol (ARP) requests to a router in one site, the network element in another site uses a network address of one of the data compute nodes (DCNs) operating in its site that is connected to the logical network segment spanning the two sites. The network element selects such an eligible DCN and uses the network address of that selected DCN to send an ARP request to the router located at the other site (because a network address is required in order to use ARP). Upon receiving an ARP response from the router with that router's data link address (i.e., layer 2 address, such as a MAC address), the network element can use the router's data link address to forward traffic directed to DCNs at the router's site that are connected to a different logical network segment that is (i) confined to that site and (ii) accessible via the router.

Figure 1:
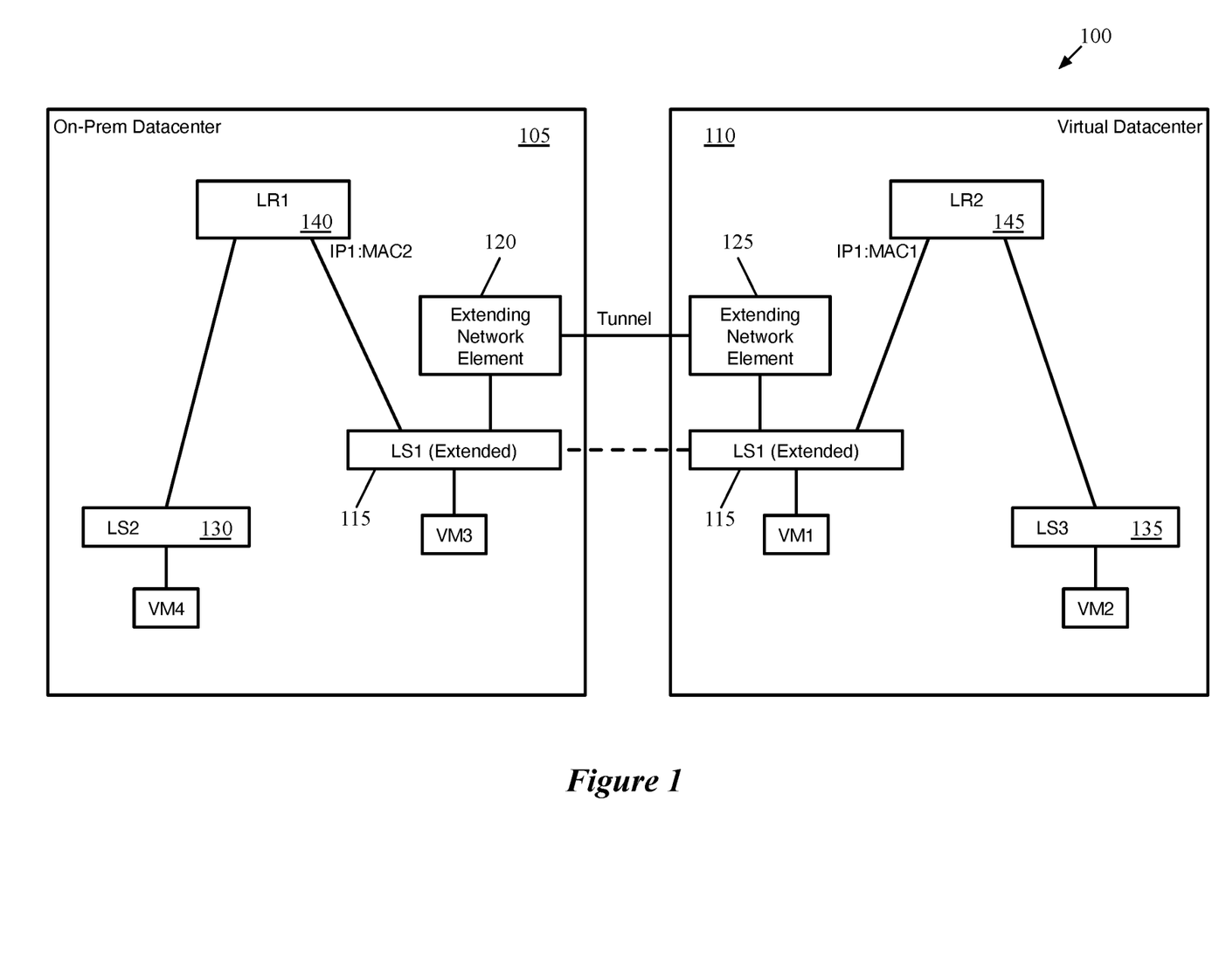
FIG. 1 conceptually illustrates a logical network that spans a physical on-premises datacenter and a virtual datacenter.

In some embodiments, the logical network spans a hybrid cloud that includes a physical on-premises datacenter site and a virtual datacenter site that operates in a public cloud (for the same enterprise that owns the physical on-premises datacenter). FIG. 1 conceptually illustrates such a logical network 100 that spans a physical on-premises datacenter 105 and a virtual datacenter 110. In some embodiments, the logical network is "extended" from the on-premises datacenter 105 to the virtual datacenter 110.

The physical on-premises datacenter 105 is a traditional enterprise datacenter managed and owned by an enterprise (e.g., with physical host computers owned by the enterprise and/or located at an enterprise). The virtual datacenter 110, in some embodiments, is a datacenter implemented within a public cloud datacenter (e.g., an AWS, Azure, GCP, etc. datacenter). The virtual datacenter 110 includes both network endpoints (e.g., application DCNs) and management components (e.g., local network manager and network controller components, which are not shown in the figure) that configure the logical network within the virtual datacenter. In some embodiments, the logical networks in the on-premises datacenter 105 and the virtual datacenter 110 are managed by the same (or a similar) network management and control system. Though operating within a public cloud, in some embodiments the virtual datacenter 110 is assigned to dedicated host computers in the public cloud (i.e., host computers that are not shared with other tenants of the cloud). Virtual datacenters are described in greater detail in U.S. patent application Ser. No. 17/852,917, which is incorporated herein by reference. In other embodiments, the virtual datacenter 110 within the public cloud may be a native virtual private cloud (VPC) of the public cloud or other virtual site implemented in the public cloud. It should also be noted that, while the example shown here is a network spanning one on-premises datacenter and one virtual datacenter, in other embodiments the invention may apply to networks spanning two on-premises or two virtual datacenters, networks spanning more than two sites, etc.

As shown, the logical network 100 includes a first logical network segment (logical switch) 115 that spans both the on-premises datacenter 105 and 110. This logical network segment 115 is extended across the sites via a pair of extending network elements 120 and 125 that are deployed at each of the sites. These extending network elements 120 and 125 are deployed as appliances (e.g., as virtual machines, containers, or other DCNs) in some embodiments, and connect via a tunnel. This tunnel may use a private link (e.g., an MPLS link) rather than being sent across the public Internet in some embodiments. The network elements 120 and 125 operate as bridges (or 2-port switches) to pass data traffic between the sites without leaving the logical network segment. Because these network elements 120 and 125 operate similarly to bridges, they are not assigned network (layer 3) addresses (e.g., IP addresses).

The logical network also includes a second logical network segment 130 that is confined to the on-premises datacenter 105 and a third logical network segment 135 that is confined to the virtual datacenter 110. Each of these three logical network segments 115, 130, and 135 connect one or more DCNs (e.g., virtual machines, containers, etc.) on the same logical layer 2 (L2) network, with DCNs connected to the first logical network segment 115 in both of the datacenters 105 and 110. The figure shows one VM connected to each of the second and third logical network segments 130 and 135 as well as one VM connected to the first logical network segment 115 in each of the datacenters 105 and 110, but it should be understood that many (e.g., tens, hundreds) of DCNs may connect to each of the logical network segments in some embodiments.

The second logical network segment 130 connects to the first logical network segment 115 via a first logical router 140. In some embodiments, both the logical network segment 130 and the logical router 140 are implemented in a distributed manner (e.g., by virtualization software executing on the host computers on which the DCNs execute in the datacenter 105). The logical router 140 includes two interfaces to which the two logical network segments 115 and 130 connect. As shown, the interface to which the first logical network segment 115 connects is assigned a network address IP1 and a data link address MAC2. This interface is the default gateway for VM3 and any other VMs attached to the logical network segment 115 at the on-premises datacenter 105. In addition, if there are no other logical network segments implemented within the virtual datacenter 110 (i.e., if logical network segment 135) does not exist), then this interface of logical router 140 is also the default gateway for VM1 and any other VMs attached to the logical network segment 115 at the virtual datacenter 110.

However, because the third logical network segment 135 is part of the logical network 100 and confined to the virtual datacenter 110, the logical router 145 is also deployed at the virtual datacenter 110. If the logical router 145 is not connected to the logical network segment 135 (a standard networking configuration, as a single logical switch would normally connect to a single logical router (its default gateway), then data traffic sent from DCNs connected to the first logical network segment 115 at the virtual datacenter 110 to DCNs connected to the third logical network segment 135 (e.g., from VM1 to VM2) would need to travel via the tunnel between extending network elements 120 and 125, then sent to the logical router 140, and routed (via a separate network, e.g., the public Internet) to the logical router 145. This configuration is not optimal for such traffic, so the logical router 145 is also connected to the logical switch 115 at the virtual datacenter 110.

As shown, the interface of the logical router 145 that connects to the logical switch 115 has the same network address IP1 and a different data link address MAC1 compared to the logical router 140 at the on-premises datacenter. Having the same network address ensures that all of the DCNs connected to the logical switch 115 (in either datacenter) use the same default gateway. When DCNs at the virtual datacenter 110 send ARP messages for the default gateway, networking constructs (e.g., in the virtualization software of the host computers) ensure that these messages are directed to the logical router 145 so that the data link address learned by these DCNs is MAC1.

When the DCNs connected to the logical switch 115 at the virtual datacenter 110 send traffic to DCNs connected to the second logical switch 130 (e.g., VM4), these DCNs will address these data messages to MAC1, so that the traffic would normally be directed to the second logical router 145. Ideally, however, this traffic should be sent via the tunnel between the extending network elements 120 and 125 to instead reach the logical router 140 at the on-premises datacenter 140. Thus, in some embodiments this traffic is intercepted by the networking constructs at the virtual datacenter (e.g., in the virtualization software of the host computers) and sent to the extending network element 125 to be tunneled to the corresponding network element 120, which can send the traffic to the logical router 140.

This data traffic, however, will have the data link address of the local logical router 145 (MAC1) as its destination address, so the extending network element 125 needs to learn the data link address of the first logical router 140 in order to properly send the traffic across the tunnel and have it handled correctly. This data link address (MAC2) may change from time to time (e.g., due to failover, deletion of an old router and creation of a new router, etc.), and thus the data link address cannot be statically configured at the extending network element 125. Instead, the network element learns the data link address through the use of ARP. However, the network element 125 does not have its own network address (because it operates similarly to an L2 bridge), while a network address is required to send an ARP request.

Figure 2:
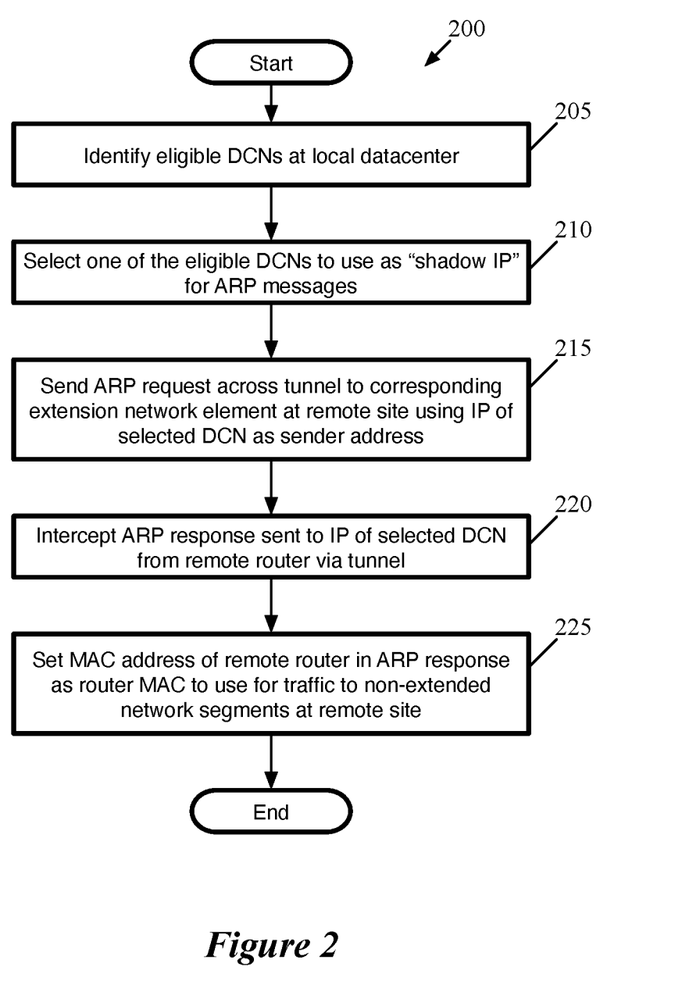
FIG. 2 conceptually illustrates a process of some embodiments for a network-extending network element to learn and use a data link address of a router in another datacenter.

FIG. 2 conceptually illustrates a process 200 of some embodiments for a network-extending network element (e.g., the network element 125) to learn and use a data link address of a router in another datacenter. In some embodiments, the network element does not have its own network address and therefore needs to "borrow" a different network address that it can use to send ARP requests. In some embodiments, this process 200 occurs in response to the extending network element receiving a data message from within its datacenter that is directed to the local router MAC. In other embodiments, the network element is configured to perform the process 200 automatically (so that the remote router MAC is known prior to it being needed).

As shown, the process 200 begins by identifying (at 205) eligible DCNs at the local datacenter (e.g., for network element 125, DCNs at the virtual datacenter 110). In some embodiments, a DCN is eligible for use by a particular network element if that DCN is (i) connected to the logical network segment that the network element extends to the remote datacenter and (ii) is located at the local datacenter with the particular network element. For instance, in FIG. 1, VM1 is an eligible DCN, while VM2 and VM3 are not eligible DCNs (VM2 because it is not connected to the logical network segment 115 and VM3 because it is located in the on-premises datacenter 105). In different embodiments, the network element identifies the eligible DCNs by receiving a list of eligible DCNs from a network management component (e.g., a network controller) or based on networking configuration data specifying the DCNs to which the network element forwards data received via the tunnel with its corresponding network element(s) at the other datacenter(s).

Next, the process 200 selects (at 210) one of the eligible DCNs to use as a "shadow IP" network address for ARP messages. That is, because the network element does not have a network address of its own, it borrows the network address of one of the eligible DCNs that are connected to the logical network segment at its datacenter. Other options, rather than borrowing a DCN network address, include using a generic network address such as 0.0.0.0. However, not all physical routers (i.e., if the router in the on-premises datacenter is a physical router rather than a logical router implemented in software) response to ARP requests using such a generic network address, especially if certain protocols (e.g., First Hop Redundancy Protocol) are in use. As such, using a valid unicast IP address within the correct subnet is more optimal. While a random network address in the subnet could be used, this runs the risk that the network address is already in use for one of the DCNs on the logical network segment at the remote datacenter. To select an eligible DCN, some embodiments use a randomization function, receive a specification from a network management component as to which DCN to select, or otherwise perform a selection operation.

Figure 3:
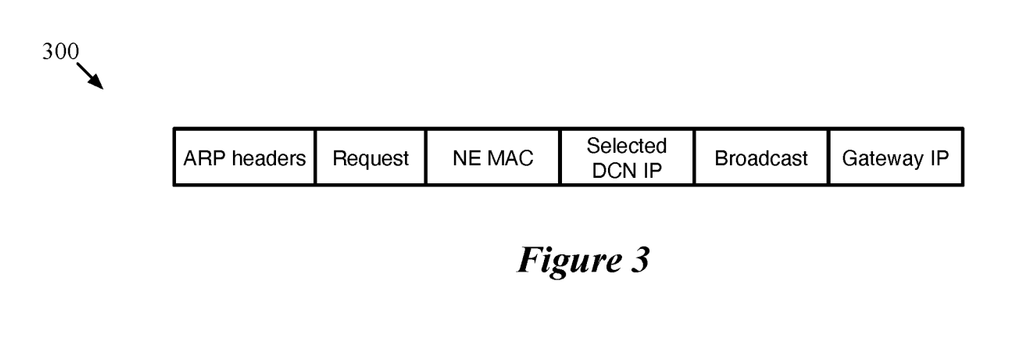
FIG. 3 conceptually illustrates an example of an ARP request message that uses a borrowed IP address.

With the DCN selected (and its network address known), the process sends (at 215) an ARP request across the tunnel between datacenters to the corresponding extension network element (e.g., network element 120) at the remote site using the network address of the selected DCN as the sender address. FIG. 3 conceptually illustrates an example of such an ARP request message 300 that uses this borrowed IP address. The ARP request message 300 includes ARP headers (e.g., the hardware type, protocol type, hardware address length, and protocol address length fields) and an operation field specifying that the message 300 is a request. The remainder of the ARP request message 300 includes the sender and target addresses. The sender addresses include the extending network element's MAC address as well as the IP address of the selected DCN that is being borrowed for this purpose. The target addresses include the standard broadcast MAC address used for all ARP requests as well as the default gateway IP address for the logical network segment (which is the IP address of both the local and remote router interfaces connecting to the logical switch).

Figure 4:
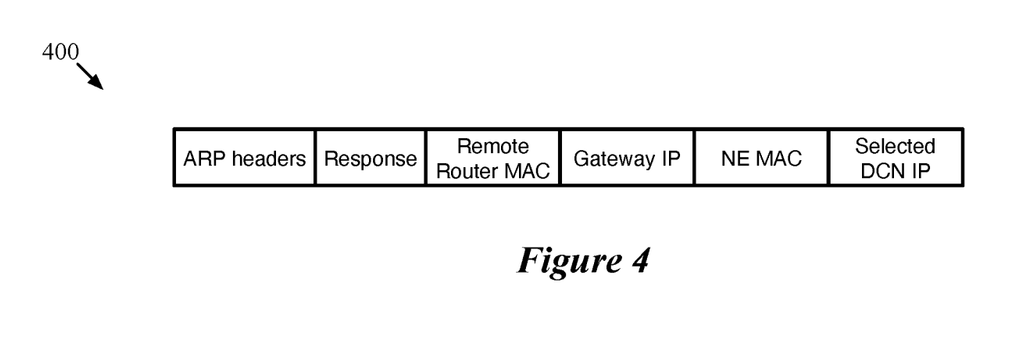
FIG. 4 conceptually illustrates an example of an ARP response message sent back to the extension network element.

This ARP request is sent across the tunnel to the corresponding extension network element the remote datacenter, which broadcasts the ARP request on the local implementation of the extended logical network segment. The router at the remote datacenter (e.g., router 140) receives the ARP request, recognizes that it is the target of the request, and sends an ARP response. FIG. 4 conceptually illustrates an example of such an ARP response message 400 sent back to the extension network element. As shown, the ARP response message 400 includes the same ARP headers and an operation field specifying that the message 400 is a response. In this case, the sender is the remote router, so the MAC of the router is used (the MAC that the network element performing the process 200 is attempting to learn) along with the default gateway IP address for the sender address fields. The target address fields are based on the sender fields in the ARP request, so the message is addressed to the MAC address of the network element that sent the ARP request as well as the IP address of the selected DCN. The corresponding network element (at the remote datacenter) receives this ARP response and, based on the target hardware address (the MAC address of the selected DCN) forwards the ARP response across the tunnel to the network element that originated the ARP request.

Returning to FIG. 2, the process 200 intercepts (at 220) the ARP response from the remote router sent to the IP address of the selected DCN via the tunnel. This ARP response, as noted above, is directed to the data link address of the network element but the network address of the DCN. Based on the data message being an ARP response directed to the data link address, the network element intercepts the ARP message.

The process also sets (at 225) the data link (MAC) address of the remote router that is in the ARP response message as the router MAC to use for traffic to non-extended network segments at the remote site (e.g., in FIG. 1, for traffic sent from VM1 to VM4). Specifically, the network element programs this learned MAC address into various address translation and/or firewall rules that the network element uses for handling such data traffic.

As noted, the actual data messages sent from DCNs connected to the logical network segment at one datacenter (e.g., the virtual datacenter) and intended for other logical network segments are addressed to the MAC address of the local default gateway. The networking constructs in that datacenter (e.g., in the host virtualization software) are configured to intercept this traffic and direct it to the extension network element in the datacenter rather than the logical router for the datacenter.

Figure 5:
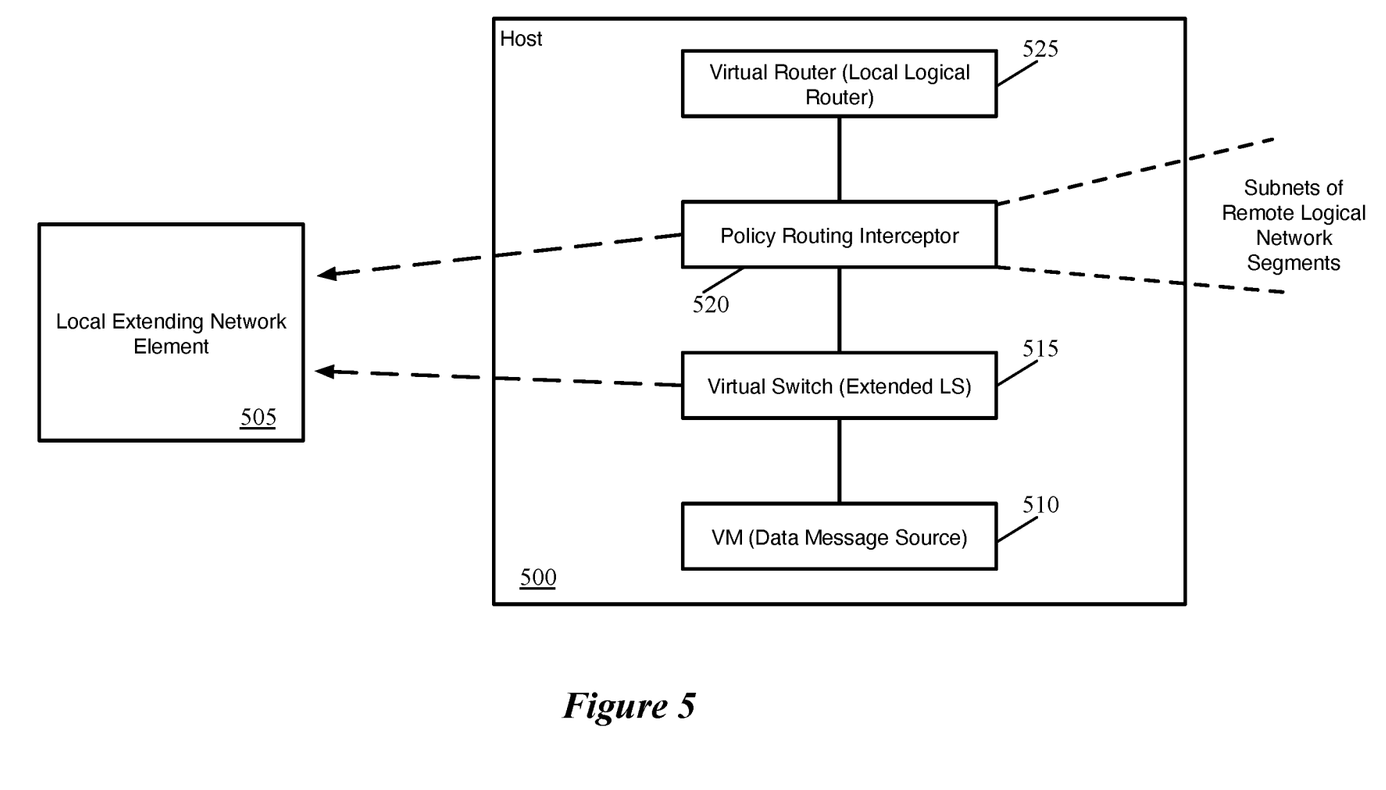
FIG. 5 conceptually illustrates the networking architecture in a host computer of some embodiments that is configured to direct certain data messages (addressed to DCNs at other datacenters) to a local network-extending network element.

FIG. 5 conceptually illustrates the networking architecture in a host computer 500 of some embodiments (e.g., within the virtual datacenter) that is configured to direct certain data messages (addressed to DCNs at other datacenters) to a local network-extending network element 505. As shown, the networking architecture in the host computer 500 includes a VM 510 (i.e., a data message source), a virtual switch 515 that implements the extended logical network segment (e.g., the logical network segment 115), a policy routing interceptor 520, and a virtual router 525 that implements the local logical router for the datacenter (e.g., the logical router 145).

In some embodiments, when a data message is sent from the VM 510, the data message is first processed by the virtual switch 515. If the data message is addressed to another DCN connected to the extended logical switch and in the same datacenter, the virtual switch 515 can direct the data message to the correct host computer within the datacenter (or directly to the DCN, if the destination DCN also operates on the same host 500). If the data message is addressed to a DCN connected to the extended logical switch but in another datacenter, the virtual switch 515 directs the data message (based on its destination MAC address) to the extension network element 505 so that this network element 505 can tunnel the data message to the corresponding network element at the other datacenter.

On the other hand, if the data message is directed to a DCN connected to a different logical network segment, then the destination MAC address will be that of the default gateway (the logical router for the local datacenter). In this case, the virtual switch 515 directs the data message to the virtual router 525. However, in some embodiments, the policy routing interceptor 520 intercepts these data messages to determine whether the data message should be provided to the virtual router for logical routing processing or directed to the network-extending network element 505. In different embodiments, the policy routing interceptor 520 is part of the virtual switch 515, part of the virtual router 525, or a separate module (e.g., associated with the port of the virtual switch 515 that connects to the virtual router 525).

Figure 6:
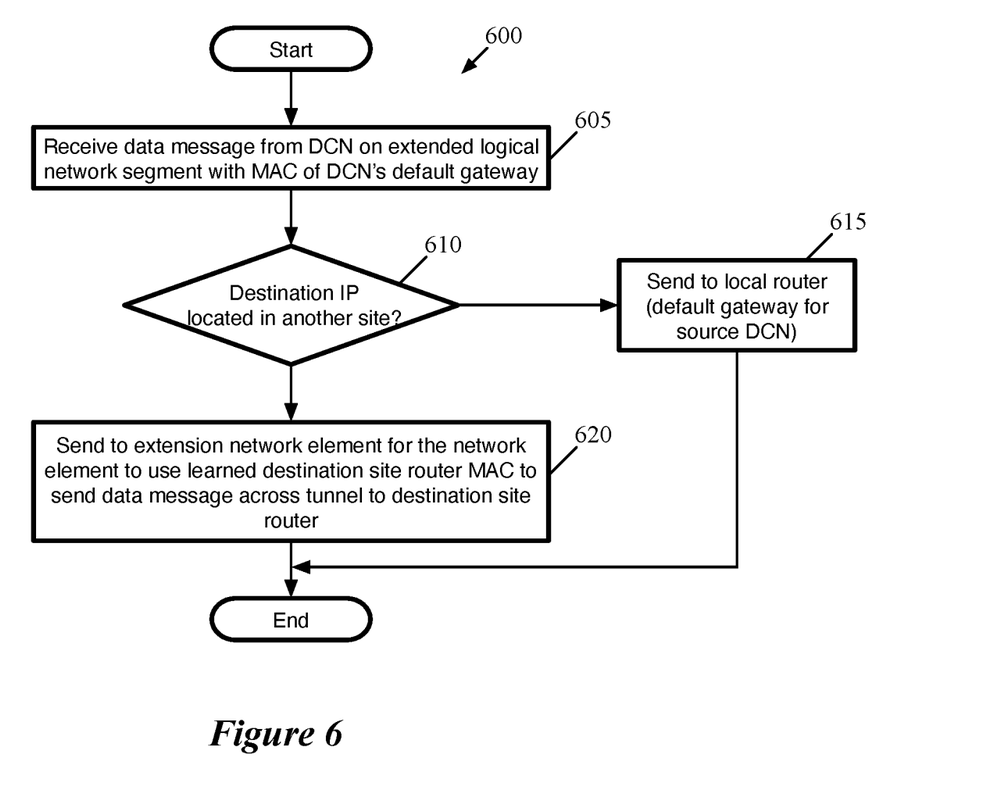
FIG. 6 conceptually illustrates a process of some embodiments for handling data traffic directed to a DCN's default gateway.

FIG. 6 conceptually illustrates a process 600 of some embodiments for handling data traffic directed to a DCN's default gateway. In some embodiments, the process 600 is performed by networking constructs in a host computer on which a DCN operates (e.g., by the policy routing interceptor 520). Specifically, the DCN connects to a logical network segment spanning multiple datacenters, and the process is performed for data messages sent by that DCN and directed to its default gateway (i.e., outside of the network-spanning logical network segment).

As shown, the process 600 begins by receiving (at 605) a data message from a DCN on an extended logical network segment with a destination MAC address of the DCN's default gateway. As described above, in some embodiments the virtual switch to which the DCN connects (that implements the logical network segment) forwards the data message to the virtual router that implements the logical router within the datacenter. However, the module (e.g., the policy routing interceptor) intercepts the data message to determine whether the data message should be processed by the virtual router or sent to another datacenter via a network-extending network element.

The process 600 therefore determines (at 610) whether the destination network address (e.g., the IP address) is located in another site. As shown in FIG. 5, the policy routing interceptor 520 is configured with a list of subnets of remote logical network segments (e.g., the network segment 130 in FIG. 1) for which data traffic should be sent to the network-extending network element (and thus remain within the logical network segment until sent to the remote datacenter).

If the destination network address is not located in another site (i.e., is located within the local site), then the process 600 sends (at 615) the data message to the local router (the default gateway for the source DCN). In some embodiments, as shown in FIG. 6, this local router is implemented within the same virtualization software of the host computer that performs the process 600. The local logical router can then route the data message to the correct logical network segment if the data message is addressed to a DCN on another logical network segment that is confined to the local datacenter. In some embodiments, if the data message is directed outside of the logical network, then the local router routes the data message to another logical router for the local datacenter that handles traffic ingressing and egressing the logical network.

On the other hand, if the destination address is located in another site (i.e., is connected to another logical network segment that is confined to another site), the process 600 sends (at 620) the data message to the extension network element (e.g., network element 505) so that the network element can use the learned MAC address of the destination site router to send the data message across the tunnel and, eventually, to that destination site router. In some embodiments, the policy routing interceptor 520 sends the data message to the network element 505 by changing the destination MAC address of the data message to a MAC address associated with the network element 505. In some such embodiments, the policy routing interceptor 520 then returns the data message to the virtual switch 510, which will forward the data message to the network element 505 based on the updated destination MAC address. In other embodiments, the policy routing interceptor 520 directly sends the data message (via the local datacenter network) to the network element 505.

Irrespective of how the data message is sent to the local network-extending network element, this network element receives the data message (which is now sent to its MAC address). The network element is configured to replace the destination MAC address with the MAC address of the remote site router prior to sending the data message across the tunnel to the corresponding network element at the remote site. This corresponding network element will forward the data message to the router based on the destination MAC address used by the first network element.

The network-extending network element uses the "borrowed" network address (of a selected DCN) for ARP requests to the router at the remote site so long as the selected DCN remains at the first site. In some embodiments, the network element uses the network address for ARP requests to routers at multiple remote datacenters. In addition, as noted above, the router MAC address may change due to failover, deletion of a router and creation of a new one, etc.

One benefit of the logical network segment spanning multiple sites is that this allows for easy migration of DCNs across the sites without any downtime. However, if the selected DCN whose network address is used by the extension network element to send ARP requests to the remote router(s) is migrated to the remote site, then its network address can no longer be used for these ARP requests. The DCN will now be visible to the router at that site and could send its own ARP requests to the router (and answer ARP requests from the router).

Figure 7:
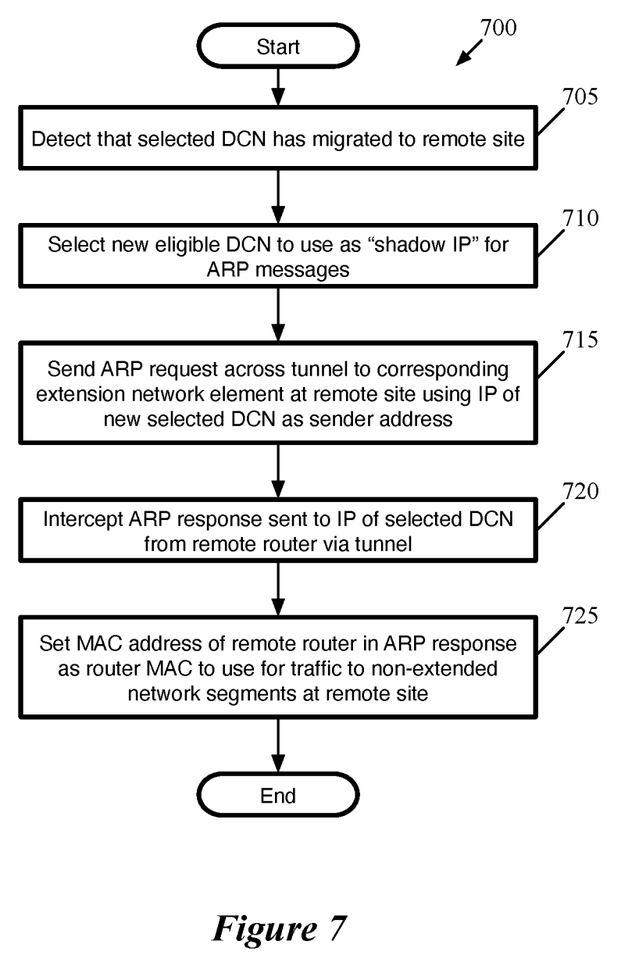
FIG. 7 conceptually illustrates a process for updating the network address a network-extending network element uses for sending ARP requests to a remote router.

FIG. 7 conceptually illustrates a process 700 for updating the network address a network-extending network element uses for sending ARP requests to a remote router. As shown, the process 700 detects (at 705) that a currently-selected DCN has been migrated to a remote site. In some embodiments, the selected DCN simply being shut down (e.g., deleted) causes a similar notification and subsequent process. In some embodiments, a network management and control system component in the local datacenter notifies the network element any time the set of DCNs that are connected to the datacenter-spanning logical network segment at the local datacenter changes, and a DCN migrating (or even being shut down) causes such a change.

Next, the process 700 selects (at 710) a one of the currently eligible DCNs to use as a new "shadow IP" network address for ARP messages. That is, because the network element does not have a network address of its own, it borrows the network address of one of the eligible DCNs that are connected to the logical network segment at its datacenter. To select an eligible DCN, some embodiments use a randomization function, receive a specification from a network management component as to which DCN to select, or otherwise perform a selection operation.

With the DCN selected (and its network address known), the process sends (at 715) an ARP request across the tunnel between datacenters to the corresponding extension network element (e.g., network element 120) at the remote site using the network address of the selected DCN as the sender address. As described above, FIG. 3 conceptually illustrates an example of such an ARP request message 300 that uses this borrowed IP address.

This ARP request is sent across the tunnel to the corresponding extension network element the remote datacenter, which broadcasts the ARP request on the local implementation of the extended logical network segment. The router at the remote datacenter (e.g., router 140) receives the ARP request, recognizes that it is the target of the request, and sends an ARP response. As described above, FIG. 4 conceptually illustrates an example of such an ARP response message 400 sent back to the extension network element. The corresponding network element (at the remote datacenter) receives this ARP response and, based on the target hardware address (the MAC address of the selected DCN) forwards the ARP response across the tunnel to the network element that originated the ARP request.

The process 700 intercepts (at 720) the ARP response from the remote router sent to the IP address of the selected DCN via the tunnel. This ARP response, as noted above, is directed to the data link address of the network element but the network address of the DCN. Based on the data message being an ARP response directed to the data link address, the network element intercepts the ARP message.

The process also sets (at 725) the data link (MAC) address of the remote router that is in the ARP response message as the router MAC to use for traffic to non-extended network segments at the remote site. Specifically, the network element programs this learned MAC address into various address translation and/or firewall rules that the network element uses for handling such data traffic.

Figure 8:
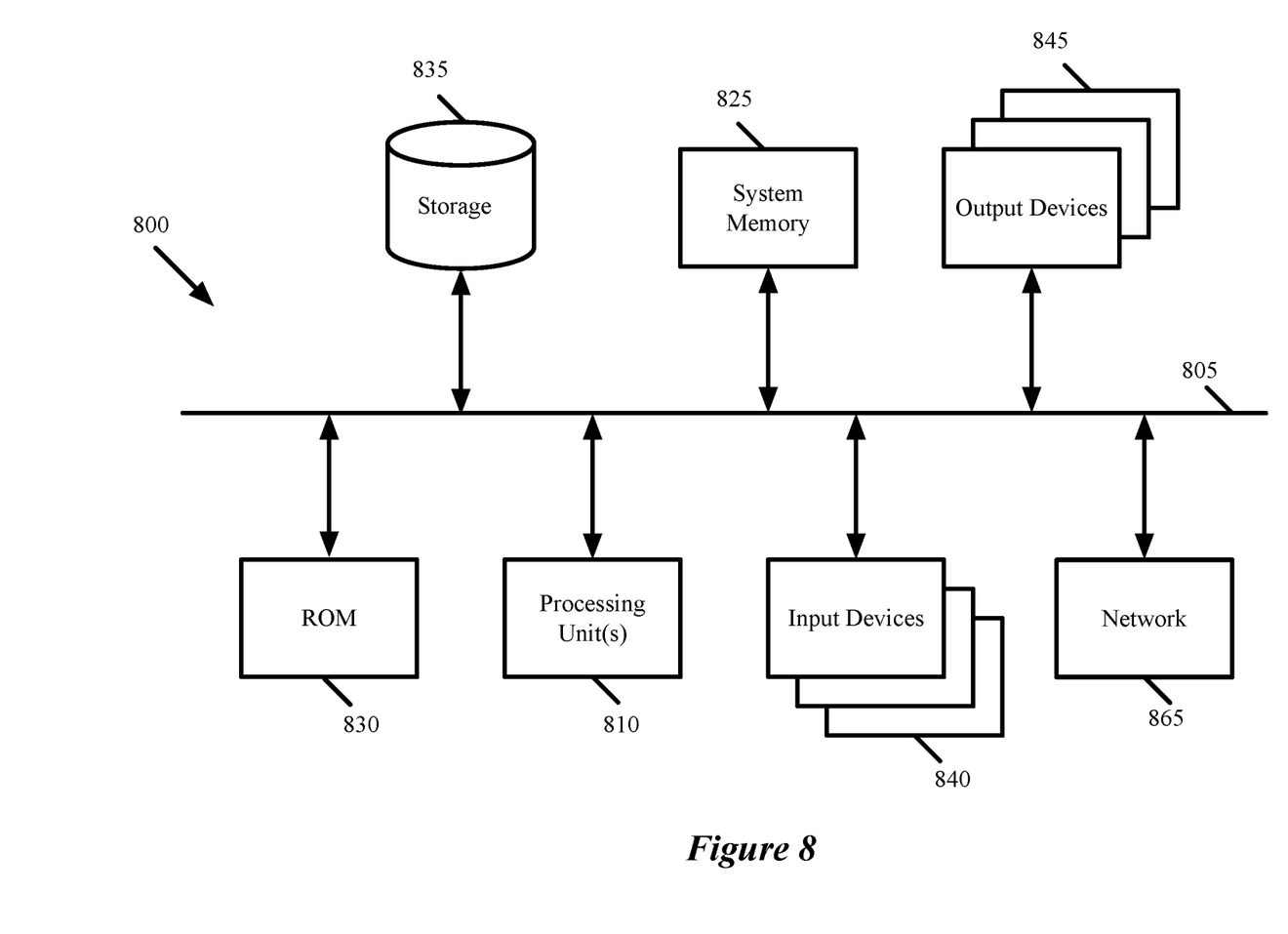
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random-access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 2, 6, and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for sending data traffic from a first site to a router in a second site, the method comprising:
    at a first network element, located at the first site, that provides a direct connection to the second site to enable a logical network to span both the first and second sites, wherein the first network element does not have an assigned network address;
    identifying a data compute node (DCN), located at the first site, that connects to a logical network segment spanning the first and second sites;
    using a network address of the identified DCN to send an address resolution protocol (ARP) request to the router located at the second site, the network address being borrowed, the ARP request being sent across a tunnel;
    detecting migration of the DCN to the second site and selecting, at random, using at least a randomization function, a new DCN at the first site for borrowing a network address to continue ARP transmissions; and
    upon receiving an ARP response with a data link address of the router located at the second site, using the data link address to forward data traffic directed to a subset of DCNs at the second site through the direct connection to the router located at the second site;
    wherein the data traffic is intercepted by virtualization software of a host on which a source DCN operates and is directed to the first network element instead of being sent to an implementation of a second router executing on the host.

2. The method of claim 1, wherein the first network element provides the direct connection to the second site via a tunnel to a corresponding second network element located at the second site.

3. The method of claim 2, wherein the logical network segment spanning the first and second sites enables migration of DCNs between the first and second sites while the DCNs remain operational.

4. The method of claim 1, wherein the router at the second site is a first router and the second router at the first site shares a network address with the first router.

5. The method of claim 4, wherein the second router is a distributed logical router that is implemented in the virtualization software of a set of host computers at the first site, including a particular host computer on which the identified DCN operates.

6. The method of claim 5, wherein:
    the data traffic directed to the subset of DCNs at the second site comprises a data message sent from the source DCN at the first site to a network address of the first and second routers.

7. The method of claim 4, wherein the first and second routers are both connected to the logical network segment that spans the first and second sites.

8. The method of claim 7, wherein:
    the logical network segment is a first logical network segment, wherein the first router also connects to a second logical network segment that is confined to the second site; and
    the first network element uses the data link address of the first router to forward data traffic sent from DCNs at the first site that are connected to the first logical network segment and directed to DCNs at the second site that are connected to the second logical network segment.

9. The method of claim 1, wherein the identified DCN is a first DCN, the method further comprising:
    detecting that the first DCN has been migrated to the second site;
    identifying a second DCN at the first site that connects to the first logical network segment; and
    using a network address of the second DCN rather than the network address of the first DCN to send an ARP request to the router located at the second site.

10. The method of claim 9, wherein after migration the first DCN communicates directly with the router located at the second site as a default gateway.

11. The method of claim 1, wherein the first site is a virtual datacenter implemented in a cloud that extends the second site and the second site is a physical on-premises datacenter.

12. The method of claim 11, wherein the first and second sites are managed by a same enterprise.

13. A non-transitory machine-readable medium storing a first network element, located at a first site, which when executed by at least one processing unit sends data traffic from a first site to a router in a second site, wherein the first network element (i) provides a direct connection to the second site to enable a logical network to span both the first and second sites and (ii) does not have an assigned network address, the first network element comprising sets of instructions for:
 identifying a data compute node (DCN), located at the first site, that connects to a logical network segment spanning the first and second sites;
 using a network address of the identified DCN to send an address resolution protocol (ARP) request to the router located at the second site, the network address being borrowed, the ARP request being sent across a tunnel;
 detecting migration of the DCN to the second site and selecting, at random, using at least a randomization function, a new DCN at the first site for borrowing a network address to continue ARP transmissions; and
 upon receiving an ARP response with a data link address of the router located at the second site, using the data link address to forward data traffic directed to a subset of DCNs at the second site through the direct connection to the router located at the second site;
 wherein the data traffic is intercepted by virtualization software of a host on which a source DCN operates and is directed to the first network element instead of being sent to an implementation of a second router executing on the host.

14. The non-transitory machine-readable medium of claim 13, wherein the first network element provides the direct connection to the second site via a tunnel to a corresponding second network element located at the second site.

15. The non-transitory machine-readable medium of claim 14, wherein the logical network segment spanning the first and second sites enables migration of DCNs between the first and second sites while the DCNs remain operational.

16. The non-transitory machine-readable medium of claim 13, wherein the router at the second site is a first router and a second router at the first site shares a network address with the first router.

17. The non-transitory machine-readable medium of claim 16, wherein:
 the second router is a distributed logical router that is implemented in virtualization software of a set of host computers at the first site, including a particular host computer on which the identified DCN operates;
 the data traffic directed to the subset of DCNs at the second site comprises a data message sent from the source DCN at the first site to a network address of the first and second routers.

18. The non-transitory machine-readable medium of claim 16, wherein:
 the logical network segment is a first logical network segment;
 the first and second routers are both connected to the first logical network segment;
 the first router also connects to a second logical network segment that is confined to the second site; and
 the first network element uses the data link address of the first router to forward data traffic sent from DCNs at the first site that are connected to the first logical network segment and directed to DCNs at the second site that are connected to the second logical network segment.

19. The non-transitory machine-readable medium of claim 13, wherein the identified DCN is a first DCN, the program further comprising sets of instructions for:
 detecting that the first DCN has been migrated to the second site;
 identifying a second DCN at the first site that connects to the first logical network segment; and
 using a network address of the second DCN rather than the network address of the first DCN to send an ARP request to the router located at the second site.

20. The non-transitory machine-readable medium of claim 19, wherein after migration the first DCN communicates directly with the router located at the second site as a default gateway.

21. The non-transitory machine-readable medium of claim 13, wherein the first site is a virtual datacenter implemented in a cloud that extends the second site and the second site is a physical on-premises datacenter.

* * * * *